United States Patent [19]

Inui et al.

[11] Patent Number: 4,646,583
[45] Date of Patent: Mar. 3, 1987

[54] REVERSE SHIFT MECHANISM FOR AUTOMOTIVE MANUAL TRANSMISSION

[75] Inventors: Masaki Inui; Shinji Ogawa, both of Toyota, Japan

[73] Assignee: Toyota Jidosha Kabushiki Kaisha, Aichi, Japan

[21] Appl. No.: 779,489

[22] Filed: Sep. 24, 1985

[30] Foreign Application Priority Data

Dec. 4, 1984 [JP] Japan .................. 59-183948

[51] Int. Cl.⁴ .............................. G05G 9/12
[52] U.S. Cl. .................... 74/473 R; 74/104; 403/263; 403/361
[58] Field of Search ........... 74/473 R, 477, 104; 403/263, 361

[56] References Cited

U.S. PATENT DOCUMENTS

| | | | |
|---|---|---|---|
| 2,711,724 | 6/1955 | Jenny | 74/7 A X |
| 4,193,316 | 3/1980 | Kelbel | 74/473 R X |
| 4,228,693 | 10/1980 | Kelbel | 74/473 R X |
| 4,297,910 | 11/1981 | Myers | 74/473 R |
| 4,307,624 | 12/1981 | Mylenek | 74/473 R X |

FOREIGN PATENT DOCUMENTS

| | | | |
|---|---|---|---|
| 105696 | 10/1938 | Australia | 403/263 |
| 672850 | 9/1929 | France | 74/473 R |
| 60-128055 | 8/1985 | Japan . | |

*Primary Examiner*—Allan D. Herrmann
*Attorney, Agent, or Firm*—Parkhurst & Oliff

[57] ABSTRACT

A reverse shift mechanism for a manual automotive transmission of the type having a reverse idler gear which is movable such as to selectively form a reverse gear train. The reverse shift mechanism includes a reverse shift arm carrying a shoe which engages with a circumferential groove in the reverse idler gear so as to push the same gear. An end of the reverse shift arm adjacent the reverse idler gear is formed with a hole, while the shoe has an end which is shaped to fit in the hole. In the assembly, end of the shoe fits in the hole formed in the reverse shift arm so that the shoe is prevented from coming off. After assembly, the shoe is clamped between the groove formed in the reverse idler gear and the hole in the reverse shift arm so that it is held in place.

6 Claims, 4 Drawing Figures

REVERSE SHIFT MECHANISM FOR AUTOMOTIVE MANUAL TRANSMISSION

FIELD OF THE INVENTION AND RELATED ART

The present invention relates to a reverse shift mechanism for an automotive manual transmission and, more particularly, to a reverse shift mechanism for the type of manual transmission which has a selective sliding reverse gear train.

An automotive manual transmission having a selective sliding reverse gear train incorporates an input system shaft and an output shaft which are mounted in parallel in a transmission casing in parallel with each other. The input system shaft and the output shaft carry a reverse driving gear and a reverse gear which are aligned with each other in the axial direction. Also, a reverse idler gear shaft, which is mounted in the transmission casing to extend in parallel with the input system shaft and the ouput shaft, carries an axially slidable reverse idler gear. The change-over to the reverse direction, i.e., reverse shift, is achieved by selectively moving the reverse idler gear by a reverse shift mechanism incorporated in the transmission to a position where it meshes with both the reverse driving gear and the reverse gear. This meshing engagement completes a reverse gear train so that torque is transmitted from the input system shaft to the output shaft through the reverse driving gear, reverse idler gear and the reverse gear.

The reverse shift mechanism for use in the transmission of the type mentioned above has, as shown in Japanese Utility Model Application No. 16977/1984 (Laid-Open Application No. 60-128055) assigned to the same assignee as that of the present invention, a reverse fork shaft provided in the transmission casing parallel to the reverse idler gear shaft, a reverse shift arm rockable so as to push the reverse idler gear, and a reverse shift fork for transmitting the shifting operation force to the reverse shift arm. The reverse shift arm is pivotally mounted at one end thereof with respect to the transmission casing and carries at the other end thereof a shift arm shoe which engages with a circumferential groove formed in the reverse idler gear. The reverse shift fork is pivotally secured at one end thereof to an intermediate portion of the reverse shift arm, while the other end thereof is mounted on the reverse fork shaft for movement together with the reverse fork shaft in accordance with shifting operation. When the shifting operation force is applied to the reverse fork shaft during reverse shifting, the reverse shift fork moves in the direction of the axis of the reverse fork shaft, which in turn causes the reverse shift arm to rock so as to push the reverse idler gear through the shift arm shoe.

In this reverse shift mechanism, one end of the shift arm shoe of the shift arm is received in the circumferential shoe groove of the reverse idler gear, and the other end is carried by the shift arm after the assembly of the shift arm into the transmission. The shift arm shoe, therefore, is materially clamped between the reverse idler gear and the shift arm, so that it need not be fixed in the direction of the axis thereof. In order to prevent the shoe from coming off during assembly and to facilitate assembly, however, it is necessary to employ a suitable retaining means such as an E ring or a C ring which has no positive function in the operation of the transmission. Consequently, the number of parts and amount of machining which are useless in the operation of the transmission are increased as is the time and labor required for the sub-assembly of the reverse shift arm and the shoe. Thus, the production cost is increased.

SUMMARY OF THE INVENTION

Accordingly, it is an object of the invention to provide a reverse shift mechanism which permits the arm shoe to be fixed in the axial direction thereof during assembly without requiring any additional fixing parts which are useless in the operation of the transmission, thereby overcoming the above-described problems of the related art.

Another object of the invention is to provide a reverse shift mechanism having a simple construction which is capable of easily fixing the shift arm shoe to the shift arm, so as to reduce time and labor required in assembly thereby reducing the cost of the transmission.

To this end, according to the invention, there is provided a reverse shift mechanism for an automotive manual transmission of the type having a reverse idler gear movable to selectively complete a reverse gear train. The reverse shift mechanism comprises a reverse shift arm which is pivotable with respect to a transmission casing so as to rock in a direction of the axis of the reverse idler gear in response to a shifting operation, and a shift arm shoe carried by a portion of the reverse shift arm adjacent the reverse idler gear so as to push the reverse idler gear. The reverse shift arm is provided in the portion thereof adjacent the reverse idler gear with a hole which is opened towards the reverse drive gear. On the other hand, the shift arm shoe has one end engaging with a circumferential groove formed in the reverse idler gear and an opposite end which is so shaped as to fit in the hole in the shift arm. By virtue of this fitting engagement, the shift arm shoe is prevented from coming off during assembly and is held securely in place, being clamped by the groove of the reverse idler gear and the hole of the reverse shift arm after assembly.

According to another feature of the invention, the hole formed in the reverse shift arm has a circular cross-section, while the mating end of the shift arm shoe has a complementary cylindrical form.

The above and other objects, features and advantages of the invention will become clear from the following description of the preferred embodiments when the same is read in conjunction with the accompanying drawings.

DETAILED DESCRIPTION OF THE PREFERRED EMBODIMENTS

The reverse shift mechanism of the invention will be fully described hereinunder with reference to the drawings which show preferred embodiments of the invention.

Figure 1:
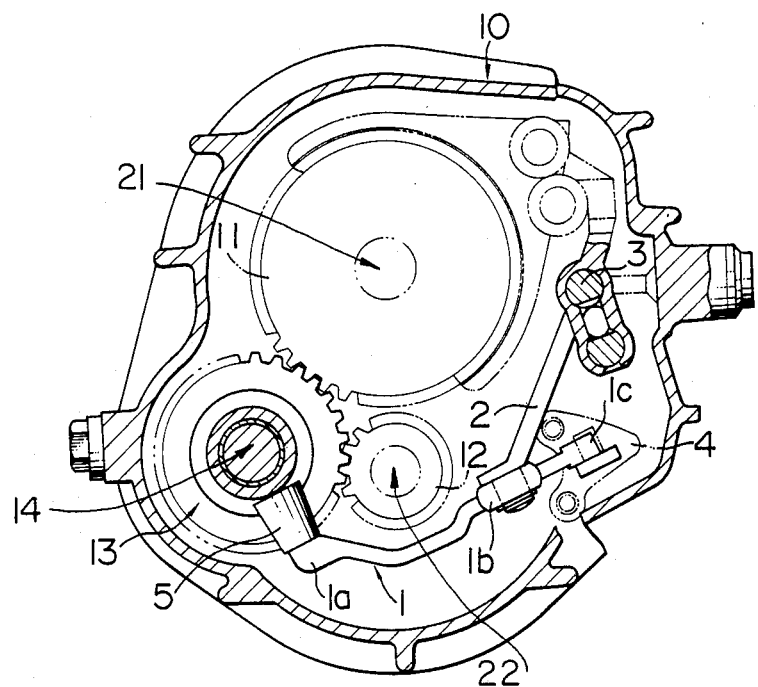
FIG. 1 is a cross-sectional view of an automotive manual transmission incorporating a reverse shift mechanism in accordance with the invention.

FIG. 1 shows an automotive manual transmission incorporating a reverse shift mechanism constructed in accordance with the invention. The transmission to which the invention is applied may be of a known construction which employs a selective sliding type reverse idler gear. In this specification, therefore, only relevant portions of the transmission will be explained briefly, while explanation of other portions will be omitted.

Referring to FIG. 1, a transmission casing 10 rotatably carries an output shaft 21 on which is provided a synchronizing device (not shown) for forward ranges. A reverse gear 11 is formed on the outer periphery of the synchronizing device. A reference numeral 12 designates a reverse counter gear, i.e., a reverse driving gear, carried by a counter shaft 22 which also is rotatably mounted in the housing 10 and adapted to be driven through an input shaft (not shown). The reverse counter gear 12 is positioned substantially in the same plane, i.e., at the same axial position, as the reverse gear 11. The reverse counter gear 12 is rotated by the counter shaft 22 whenever a clutch of an automobile is engaged to drive the counter shaft, but is spaced from the reverse gear 11 so as not to engage with the gear 11. A reverse idler gear 13 is disposed on one side of the reverse counter gear 12 at a position where it can engage both the reverse counter gear 12 and the reverse gear 11 simultaneously thereby forming a reverse gear train.

Figure 4:
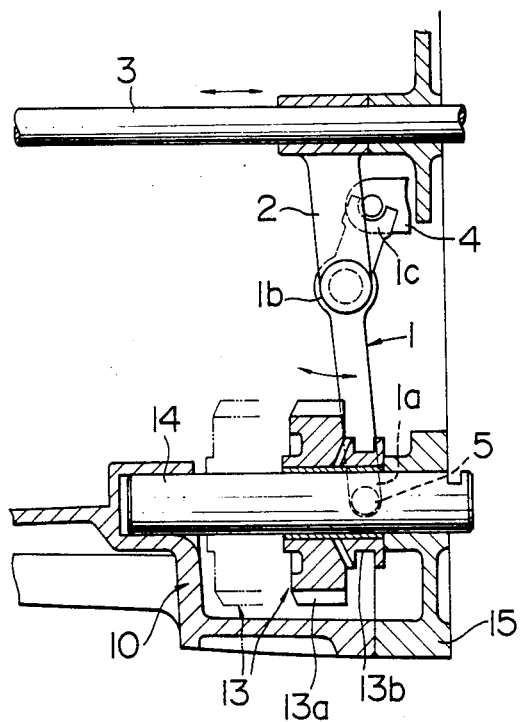
FIG. 4 is a vertical cross-sectional view of an essential portion of the reverse shift mechanism shown in FIG. 1, for illustrating the operation of the mechanism.

FIG. 4 shows the manner in which the reverse idler gear 13 and the reverse shift mechanism engage with each other The reverse idler gear 13 has a gear portion 13a which is engageable with the reverse gear 11 and the reverse driving gear 12 and a grooved portion 13b which is integral with the gear portion 13a. The grooved portion 13b is provided with a circumferential groove which is engageable with a shift arm shoe 5. Reference numeral 14 designates a reverse idler gear shaft which is carried by the casing 10 and also by an intermediate plate 15 removably fixed to the casing 10. The reverse idler gear 13 is mounted on the shaft 14 for free rotation and sliding movement in the axial direction.

Referring again to FIG. 1, the reverse shift mechanism has a reverse shift arm 1, a reverse shift fork 2, and a reverse fork shaft 3. The reverse shift arm 1 is provided in one end 1a thereof with a hole 1d and carries the shaft arm shoe 5 which is so shaped as to mate with the grooved portion 13b of the reverse idler gear. The other end 1c of the reverse shift arm is bifurcated so as to engage with a projection of a shift arm bracket 4 which is fixed to, for example, the intermediate plate 15. The reverse shift arm 1 is rockable about a point on the end 1c thereof.

On the other hand, the reverse fork shaft 3 is axially movably carried by the casing 10 as will be seen from FIG. 4. To the reverse fork shaft 3 is fixed one end of the reverse shift fork 2 such as to move together with the reverse fork shaft 3. The other end of the reverse shift fork 2 has an engaging projection which fits in a hole formed in an intermediate portion 1b of the reverse shift arm, so that the reverse shift fork 2 is pivotally connected to the reverse shift arm 1. Although in the described embodiment the reverse shift fork 2 moves together with the shaft 3, this is not exclusive and the arrangement may be such that the reverse fork shaft 3 is fixed while the reverse shift fork 2 moves relative to the shaft 3. In this case, however, it is necessary that the manual shifting force be directly applied to the reverse shift fork.

Figure 2:
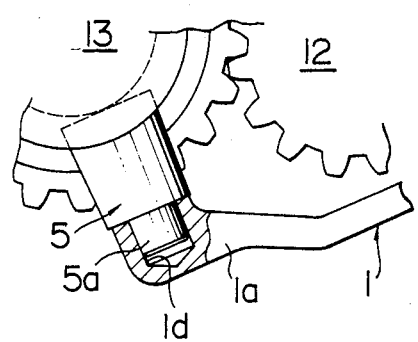
FIG. 2 is an enlarged view of an essential portion of the embodiment shown in FIG. 1.

FIG. 2 is an enlarged view showing the manner in which the shaft arm shoe 5 is secured to the reverse shift arm 1. The reverse shift arm 1 is provided at the end 1a thereof with the circular hole 1d which opens toward the reverse idler gear, while an end portion 5a of the shift arm shoe 5 has a cylindrical form so as to be able to fit in the hole 1d. In the assembly of the reverse shift mechanism in the transmission, a temporary fixing of the shift arm shoe 5 to the reverse shift arm 1 is achieved simply by fitting the end portion 5a in the hole 1d formed in the shift arm 1. The shift arm shoe 5 is fixed in this position and does not come off easily even when the reverse shift arm 1 is turned sideways or upside down, by virtue of the vacuum or suction effect caused by air confined in the hole 1d. This vacuum or suction effect will be enhanced by applying a lubricating substance such as oil or a grease either to the end portion 5a of the shoe 5 or to the wall of the hole 1d.

Figure 3:
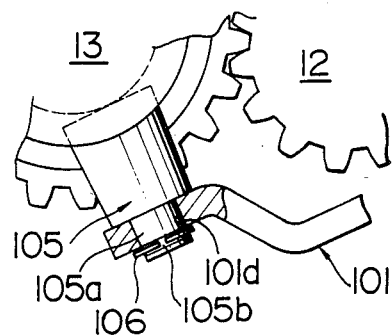
FIG. 3 is an enlarged view of an essential portion of the reverse shift mechanism of the related art.

FIG. 3 shows the related art described hereinbefore, particularly an example of the manner of engagement between a shift arm shoe 105 and a reverse shift arm 101 in a reverse shift mechanism of the related art. In this case, an end portion 105a of the shift arm shoe 105 fits in a through hole 101d formed in the end of the shift arm 101. As in the case of the described embodiment of the invention, the end portion 105a of the shift arm shoe 105 also has a cylindrical form. In addition, a groove 105b is formed in a portion of the end portion 105a projecting from the shift arm 101. For assembling the reverse shift arm 101 in a transmission, a "C" ring 106 is fitted in the groove 105b in order to prevent the shift arm shoe from coming off, such that a sub-assembly is formed of the shift arm shoe 105 and the reverse shift arm 101.

The operation of the above embodiment of the invention will be explained hereinunder with reference to FIG. 4.

FIG. 4 shows the reverse shift mechanism in the neutral state. When the driver operates the mechanism to shift into reverse shift, the manual force 4 exerted by the driver is transmitted to the reverse fork shaft 3 through a shift and select lever (not shown) and a shift head (not shown) fixed to the reverse fork shaft 3, so that the reverse fork shaft 3 is moved to the left as viewed in FIG. 4. At the same time, the reverse shift fork 2 is moved to the left so as to cause the reverse shift arm 1 to rotate clockwise about the end 1c thereof. Consequently, the shift arm shoe 5, which is mounted on the end 1a of the reverse shift arm and which engages with the grooved portion 13b of the reverse idler gear, pushes the reverse idler gear 13 leftwardly to a position shown by two-dot-and-dash line in FIG. 4. In this state, the gear portion 13a of the reverse idler gear 13 meshes with the reverse gear 11 and the reverse driving gear 12 so as to form the reverse gear train, so that power is transmitted through from the input shaft to the output shaft 21 through the counter shaft 22. The neutral shifting is achieved by a sequence which is the reverse of the described sequence of the reverse shift.

As will be understood from the foregoing description, the invention provides a reverse shift mechanism in which an end portion of a shift arm shoe engaging with a groove in the reverse idler gear has a shape which fits in a hole formed in the end of a reverse shift arm of the reverse shift mechanism. With this arrangement, a temporary fixing of the shift arm shoe in the axial direction thereof can be achieved simply by fitting an end portion of the shift arm shoe in the hole formed in the end of the reverse shift arm, because the air confined in the hole serves to create a vacuum or suction effect to thereby temporarily fix the shift arm shoe.

With this arrangement, it is possible to eliminate the necessity for the parts and additional machining which were useless in the operation of the mechanism but could not be omitted for assembly purposes. In addition, process for assembly of the reverse shift mechanism is simplified advantageously.

According to the invention, therefore, it is possible to obtain an inexpensive reverse shift mechanism which is simple in construction while capable of performing all the necessary functions. This in turn permits a reduction in the cost of production of the transmission and, hence, the cost of mass-produced automobiles.

What is claimed is:

1. A reverse shift mechanism for an automotive manual transmission of a type having a reverse idler gear which is movable to selectively complete a reverse gear train, said reverse shift mechanism comprising:

a reverse shift arm having a portion disposed adjacent said reverse idler gear and pivotally carried with respect to a transmission casing so that said portion rocks along a direction of axis of said reverse idler gear in response to shifting operation, said portion of said reverse shift arm being provided with a blind hole which is open at a first end toward said reverse idler gear and is closed at a second end away from said reverse idler gear; and a shift arm shoe carried by said portion of said reverse shift arm adjacent said reverse idler gear for pushing said reverse idler gear, said shift arm shoe having an end adapted to engage with a circumferential groove formed in said reverse idler gear and an opposing end shaped to fit in said blind hole of said reverse shift arm;

whereby said shift arm shoe is prevented from coming off during assembly by virtue of a vacuum effect created by air confined in said blind hole by fitting engagement between said opposing end and said blind hole, and is held in place after assembly by being clamped between the groove of said reverse idler gear and said blind hole of said reverse shift arm.

2. A reverse shift mechanism according to claim 1 wherein said blind hole in said reverse shift arm has a circular cross-section, while said opposing end of said shift arm shoe has a cylindrical shape which just fits in said blind hole.

3. A reverse shift mechanism according to claim 2 further comprising a lubricating substance between said opposing end of said shift arm shoe and at least one wall of said blind hole, whereby said vacuum effect is enhanced.

4. A reverse shift mechanism according to claim 1 further comprising a lubricating substance between said opposing end of said shift arm shoe and at least one wall of said blind hole, whereby said vacuum effect is enhanced.

5. A reverse shift mechanism for a manual automotive transmission of a type having a transmission casing rotatably carrying an input shaft and an output shaft, a counter shaft rotatably mounted in said transmission casing parallel to said output shaft and adapted to be driven through said input shaft, a reverse driving gear and a reverse gear carried by said counter shaft an said output shaft, respectively, substantially in alignment with each other in the axial direction thereof, and a reverse idler gear slidably carried by a reverse idler gear shaft mounted in said transmission casing parallel to said counter shaft and said output shaft, said reverse idler gear being adapted to engage simultaneously both said reverse driving gear and said reverse gear thereby completing a reverse gear train, said reverse shift mechanism comprising:

a reverse fork shaft mounted in said transmission casing parallel to said reverse idler gear shaft;

a reverse shift arm having a first end portion adjacent to said reverse idler gear and a second end portion which is pivotally carried with respect to said transmission casing such that said first end portion rocks along a direction of axis of said reverse idler gear, said reverse shift arm being provided with a blind hole formed in said first end portion which is open at a first end toward said reverse idler gear and is closed at a second end away from said reverse idler gear;

a reverse shift fork for transmitting a manual shifting force to said reverse shift arm thereby causing said reverse shift arm to rock, said reverse sift fork being mounted at one end thereof on said reverse fork shaft so as to move in an axial direction thereof in response to shifting operation and pivoted at the other end thereof to an intermediate portion of said reverse shift arm; and a shift arm shoe carried by said first end portion of said reverse shift arm for pushing said reverse idler gear, said shift arm shoe being provided with an end which engages with a circumferential groove formed in said reverse idler gear and an opposing end shaped to fit in said blind hole formed in said reverse shift arm;

whereby said shift arm shoe is prevented from coming off during assembly by virtue of a vacuum effect created by air confined in said blind hole by fitting engagement between said opposing end and said blind hole, and is held in place after assembly by being clamped between the groove of said reverse idler gear and said blind hole of said reverse shift arm.

6. A reverse shift mechanism according to claim 5 further comprising a lubricating substance between said opposing end of said shift arm shoe and at least one wall of said blind hole, whereby said vacuum effect is enhanced.

* * * * *